1## United States Patent
Kang et al.

(10) Patent No.: US 8,965,400 B2
(45) Date of Patent: Feb. 24, 2015

(54) APPARATUS AND METHOD FOR DISPLAYING A POSITION OF MOBILE TERMINAL

(71) Applicant: Samsung Electronics Co., Ltd., Gyeonggi-do (KR)

(72) Inventors: Jiyoung Kang, Gyeonggi-do (KR); Kyunghwa Kim, Seoul (KR); Heewoon Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 279 days.

(21) Appl. No.: 13/673,018

(22) Filed: Nov. 9, 2012

(65) Prior Publication Data
US 2013/0157697 A1 Jun. 20, 2013

(30) Foreign Application Priority Data
Dec. 15, 2011 (KR) ........................ 10-2011-0135352

(51) Int. Cl.
*H04W 24/00* (2009.01)
*H04W 4/00* (2009.01)
*H04W 4/02* (2009.01)

(52) U.S. Cl.
CPC ....................................... *H04W 4/02* (2013.01)
USPC .................. 455/456.1; 455/456.2; 455/456.3; 455/457; 455/466; 370/328

(58) Field of Classification Search
CPC ... H04W 64/00; H04W 4/02; H04L 29/08657
USPC ................ 455/456.1, 456.2, 456.3, 457, 466; 370/328
See application file for complete search history.

(56) References Cited

U.S. PATENT DOCUMENTS

| 8,594,709 | B2 * | 11/2013 | Jang et al. | 455/457 |
| 8,600,412 | B2 * | 12/2013 | Jang et al. | 455/456.3 |
| 8,638,720 | B2 * | 1/2014 | Huang et al. | 370/328 |
| 8,670,781 | B2 * | 3/2014 | Kim et al. | 455/456.1 |
| 8,744,489 | B2 * | 6/2014 | Jang et al. | 455/456.2 |
| 8,750,910 | B2 * | 6/2014 | Jang et al. | 455/466 |
| 2014/0055098 | A1 * | 2/2014 | Lee | 320/137 |
| 2014/0141802 | A1 * | 5/2014 | Huang et al. | 455/456.1 |
| 2014/0235281 | A1 * | 8/2014 | Jang et al. | 455/457 |

FOREIGN PATENT DOCUMENTS

KR   10-1013751 B1   2/2011
KR   10-2011-0048939 A   5/2011

* cited by examiner

*Primary Examiner* — William D Cumming
(74) *Attorney, Agent, or Firm* — Sca & Reiter, LLC (57) ABSTRACT

A method and apparatus for displaying a location of a portable terminal of another subscriber's by the calling party's portable terminal. This display occurs during a call without switching displayed screen windows or applications. The method includes a first portable terminal performing a call mode; driving a camera upon receiving location information of the other subscriber's terminal in the call mode to display an image photographed by the camera; and analyzing location information detected by a location detection unit and the received location information of a second portable terminal of another subscriber to calculate a distance between two terminals and displaying a location of the other subscriber's terminal on the displayed image when a direction of the calling party's terminal detected by a direction detection unit aligns with a direction of the other subscriber's terminal.

21 Claims, 9 Drawing Sheets

APPARATUS AND METHOD FOR DISPLAYING A POSITION OF MOBILE TERMINAL

CLAIM OF PRIORITY

This application claims the benefit under 35 U.S.C. §119 (a) from a Korean patent application Serial No. 10-2011-0135352, filed on Dec. 15, 2011 in the Korean Intellectual Property Office, the entire disclosure of which is hereby incorporated by reference in its entirety.

BACKGROUND OF THE INVENTION

1. Field of the Invention

The present invention relates to an apparatus and a method for displaying a location of a portable terminal. More particularly, the present invention relates to an apparatus and a method for displaying a location of a terminal of other subscribers during a call.

2. Description of the Related Art

A portable terminal now provides various types of functions, particularly communication functions, among which is a video call service. In the video call service, the information of a calling party (caller and callee) is displayed on a screen of each party to the call. Typically, an image of the other calling party is displayed to be larger than an image of the calling party.

Here, when a location of the other calling party needs to be identified during the video call, the portable terminal cannot immediately display the location information during a call even if the location information of the other party is received. In other words, when a subscriber A receives location information of a subscriber B during a call, a received location may not be immediately displayed without two or more steps of an application that are required to be performed to display a location of the subscriber B on the display of the portable terminal of subscriber A. The requirement applies regardless of a distance between a user and a destination.

For example, when the portable terminal has an application which displays location information provided by a third party, location information provided by another subscriber is searched through a global positioning system (GPS) and a distance and a direction from a current location of the portable terminal to the other subscriber is calculated and displayed based on a searched result. Thus, a method of displaying location information described above uses a one way communication, not a two way communication.

Therefore, in a conventional portable terminal, the problems include that location information may not be shared between calling parties during a call and the shared location information may not be displayed while a call is performed.

SUMMARY OF THE INVENTION

Accordingly, the present invention has been made to provide a method and an apparatus for providing a three dimensional user interface of an electronic device in which a user may easily manipulate content items may be easily disposed in a three dimensional space.

The present invention provides an apparatus and a method for sharing location information between calling parties during a call and displaying the shared information. To this end, information of a destination to which a calling party wishes to go is provided from the other subscriber during a call and a result is displayed on a screen. According to the present invention, during a video call, the calling party requests and receives location information of the other subscriber and the location information is immediately displayed on a communication window (a window in which an image of the calling party is displayed).

Thus, the present invention provides a method in which during a call supported by a terminal, an image display area, augmented reality technology, and technology for detecting location information of a calling party and another subscriber, wherein GPS information or information received through Wi-Fi or from three base stations may be utilized, such that a location of the other subscriber with whom a user is having a video call may be easily located and accessed.

In accordance with an exemplary aspect of the present invention, an apparatus for displaying a location of another subscriber's terminal in a calling party's terminal may preferably include a communication unit; a location detection unit configured to detect a location of a terminal; a direction detection unit configured to detect a direction of the terminal; a camera configured to photograph an image; a controller configured to receive location information of the other subscriber's terminal in a call mode, configured to drive the camera upon receiving the location information of the other subscriber's terminal to display an image photographed by the camera, configured to analyze location information detected by the location detection unit and the received location information of the other subscriber's terminal to calculate a distance between two terminals, and configured to display the location of the other subscriber's terminal on the displayed image when a direction detected by the direction detection unit aligns with the location of the other subscriber's terminal; and a display unit configured to display a location of the other subscriber on the image photographed by the camera, according to the controller.

According to an exemplary aspect of the present invention, the calling party requests the location information of the other subscriber during a call. Subsequently, the calling party receives location information, such as, for example, the location information of latitude and longitude transmitted from the other subscriber, and calculates a distance between the calling party and other subscriber using location information of the other subscriber and current location information of calling party. Also, the calling party detects a direction of other subscriber using a detection unit.

The present invention provides a sharing location information between calling party and called party during a call without a call disconnection without using complicated location search procedure.

In accordance with another exemplary aspect of the present invention, a method of displaying a location of another subscriber's terminal in a calling party's terminal may preferably include: performing/operating in a call mode that is preferably a video call mode; driving a camera upon receiving location information of the other subscriber's terminal in the call mode to display an image photographed by the camera; and analyzing location information detected by a location detection unit and the received location information of the other subscriber to determine a distance between two terminals and displaying a location of the other subscriber's terminal on the displayed image when a direction of the calling party's terminal detected by a direction detection unit aligns with a direction of the other subscriber's terminal.

In another exemplary aspect of the invention, a first portable terminal detects and displays a location of a second portable terminal during a wireless call therebetween, the first portable terminal comprising:

a display unit; a communication unit; a location detection unit configured to detect a first location of the first portable terminal; a direction detection unit configured to detect a direction of the first portable terminal relative to the second portable terminal during a call between the first portable terminal and the second portable terminal; a camera configured to photograph an image; a controller configured to receive location information of the second portable terminal while the first portable terminal is engaged in a call mode with the second portable terminal, configured to operate the camera upon receiving the location information of the second portable terminal to display an image photographed by the camera on the display, configured to analyze the first location information detected by the location detection unit of the first portable terminal and the received location information of the second portable terminal to calculate a distance between the first portable terminal and the second portable terminal, and configured to display the location of the second portable terminal on the displayed image when a direction of the first portable terminal detected by the direction detection unit aligns with the location of the second portable terminal; and wherein the display unit is configured to display a location of the second portable terminal on the image photographed by the camera, according to control of the controller.

BRIEF DESCRIPTION OF THE DRAWINGS

The exemplary objects, features and advantages of the present invention will become more apparent to the person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

In the present invention, location information of another subscriber's portable terminal is requested during a call by a first portable terminal that is a party to the call, and location information received from the other subscriber's portable terminal is displayed on a screen of a calling party. To this end, a portable terminal according to an exemplary embodiment of the present invention provides a function and a configuration for obtaining and transmitting location information thereof while maintaining a call state when a location information request message is received during a call. Also, the portable terminal according to an exemplary embodiment of the present invention provides a function and a configuration for requesting location information from a portable terminal of another subscriber during a call and displays the received location information of the other subscriber on an image photographed by a camera or a map. The portable terminal according to an exemplary embodiment of the present invention may easily access a location of the other party of a user's call by using augmented reality (AR) technology and a user's location detection technology such as, for example, global positioning system (GPS) information or information received from Wi-Fi or three base stations. Also, a method of displaying a location of the other subscriber on the image photographed by the camera or a map screen is provided. The above method may be effective particularly in case of a video call.

Figure 1:
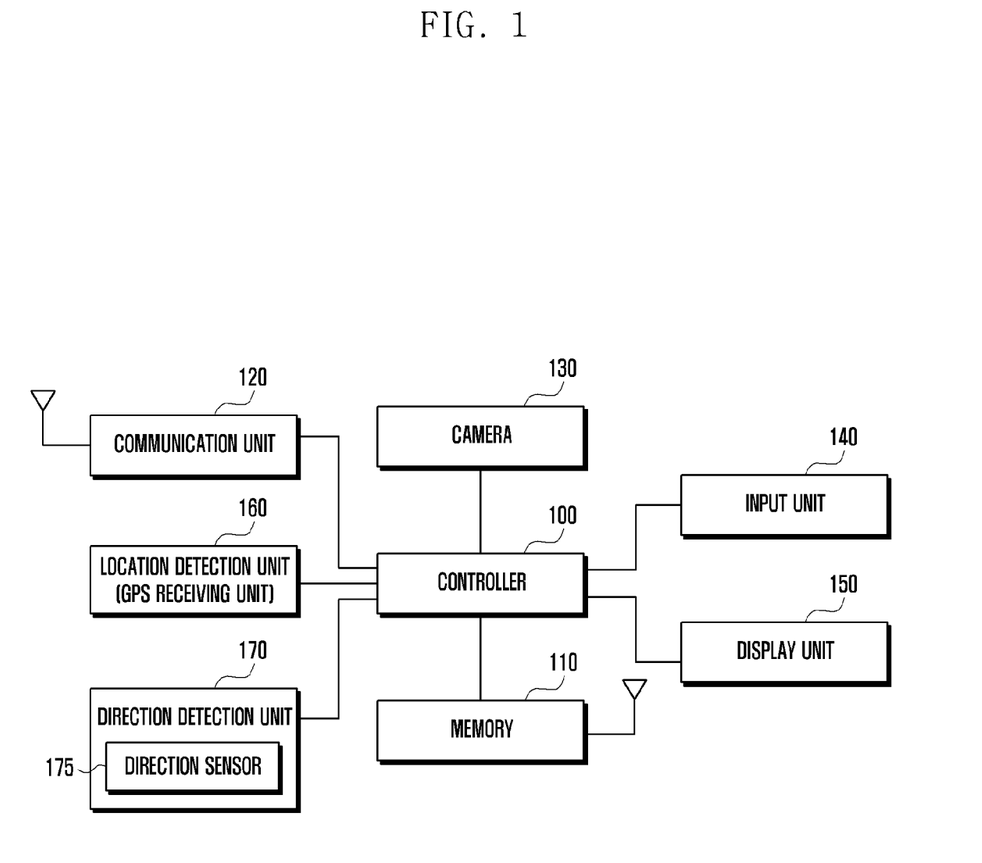
FIG. 1 is a view illustrating a configuration of a portable terminal according to an exemplary embodiment of the present invention.

FIG. 1 is a view illustrating an exemplary configuration of a portable terminal according to an exemplary embodiment of the present invention.

Referring now to FIG. 1, a location detection unit 160 may generate location information of a portable terminal. Here, the location detection unit 160 may be configured as a global positioning system (GPS) receiving unit receiving satellite signals typically via the communication unit and/or may detect a location of a terminal by using information received from Wi-Fi or from three or more base stations. In an exemplary embodiment of the present invention, it is assumed that the location detection unit 160 is provided with the GPS receiving unit, but it should be appreciated by the artisan that the scope of the claimed invention is not limited to location detection with the GPS receiving unit. Here, the location information may be latitude and longitude information. Also, the location detection unit 160 may be further provided with an altitude (height) sensor which generates information of an altitude at which the terminal is located. The height sensor may constitute a pressure sensor for measuring pressure or a sensor using a satellite signal (and pressure), or may use a radar. In the case where the GPS receiving unit can detect a height of the terminal, the altitude sensor may be omitted. A direction detection unit 170 includes a direction sensor 175 that detects a direction in which the terminal is positioned. The direction sensor 175 may be implemented as a magnetic sensor, a compass, and/or a gyroscope.

A communication unit 120 performs to wirelessly connect the portable terminal with a respective corresponding base station. Here, the communication unit 120 may be, for example, a base station communication network or an Internet communication network. The communication unit 120 may be provided with a transceiver including a transmission unit, which includes a frequency up converter for up-converting a transmission signal into an RF frequency band and a power amplifier, and a reception unit, which includes a low noise amplifier for low noise amplifying a received signal and a frequency down converter for down-converting the RF signal into a base band. Also, the communication unit 120 may be provided with a modulation unit (not shown) for modulating the transmission signal to be transmitted to the transmission unit and a demodulating unit for demodulating a signal output from the reception unit. An artisan should understand and appreciated that all of the items throughout with the term "unit" constitute hardware, and/or hardware configured with software or firmware as to constitute statutory subject matter in the scope of the appended claims. In this case, the modulation/demodulation unit may compatible with 3G such as, for example, WCDMA or CDMA, or compatible with 4G such as GSM or LTE. Alternatively, the modulation/demodulation unit may comply with Wi-Fi or Wibro, or Wimax.

A camera 130 performs a function to photograph an external image. The camera may include, for example, an active pixel sensor (APS), or a charge-coupled device (CCD), or any other type of optical sensor to obtain an image.

A display unit 150 performs a function to display a display data according to control of the controller 100. An input unit 140 performs a function to input a command and a data for controlling an operation of the portable terminal. Here, the input unit 140 and the display unit 150 may be integrated into a touch screen panel, and may constitute, for example, any type of thin film technology (TFT) display compatible with touch sensitivity.

The controller 100, which constitutes hardware such as a processor or microprocessor, is configured to control an overall operation of the portable terminal. Also, the controller 100 receives location information of other subscriber during a call according to an exemplary embodiment of the present invention and performs to display the received location information on a screen.

A memory 110, which is a non-transitory machine readable medium, may include a program memory portion for storing an operation program of the portable terminal and programs in accordance with an exemplary embodiment of the present invention and a data memory portion for storing an installation data and a data generated during executing the program. The memory 110 may include a map storage unit for storing a map data. The map may store a 2D map or 3D map data.

In the portable terminal described above, the controller 100 may control the display of a location of the other subscriber of a call during operation of the call. This display of location of the other subscriber can be automatic without any user request, and may be configured as modifiable default. For example, if the battery power drops to below a threshold, the display of the location of the other subscriber's terminal location may not be automatically displayed. Here, the location of the other subscriber may be displayed through an augmented reality (AR) function on a screen photographed through the camera 130.

In the description herein below, a calling party refers to a user whose portable terminal (e.g. a first portable terminal or an initiating portable terminal) requests the location information of the other subscriber (i.e. the location of the portable terminal (e.g. a second portable terminal or a target portable terminal) used by the other subscriber, receives location information transmitted from the other subscriber, and displays the location information on the first portable terminal, and the other subscriber refers to a user whose second (target) portable terminal generates and transmits location information thereof when the location information is requested by the first portable terminal, which is the calling party. Also, in order to display the location of the other subscriber's terminal according to an exemplary embodiment of the present invention, the controller 100 may be provided with a actuation capability to actuate a function (some examples may be a display of a virtual or an actual button, a menu or an application) requesting the location information of the other subscriber during a call and a function (button, menu or application) for generating the location information thereof when the location information is requested and transmitting the location information to the calling party.

In order to display the location of the other subscriber (the other subscriber's portable terminal) during a call, in response to a detected selection by the calling party regarding a location information request function, the controller 100, which detects the request function, generates a location information request message to be transmitted to the other subscriber's portable terminal through the communication unit 120. Then, the other subscriber selects (or alternatively the other subscriber's portable terminal may automatically activate a location information transmission function during a call. The controller 100, which detects this identifies the location information of the other subscriber via the other subscriber's portable terminal through the location detection unit 160, generates a location information message to be transmitted through the communication unit 120. Here, the location detection unit 160 may be a GPS receiving unit and may receive the latitude and longitude information of a location at which the other subscriber and their portable terminal is currently located. Also, when the location detection unit 160 is provided with an altitude detecting function, the detected altitude information may be included in addition to the latitude and longitude information.

Also, the controller 100 of the portable terminal which requests the transmission of the location information also drives the rear side camera 130 of the portable terminal, i.e., a camera located on a rear side of the display unit 150, to photograph the external image for transmission to the other calling party. When the location information is received from the other subscriber's portable terminal, a current location of the portable terminal is detected through the location detection unit 160 and a distance between two portable terminals is calculated by analyzing detected locations of both the portable terminal of the calling party and the portable terminal of the other subscriber. Also, the controller 100 sets a direction, e.g., North, East, West or South (NEWS), to which the camera 130 is directed through the direction detection unit 170. Namely, the direction detection unit 170 detects a direction to which the camera 130 is directed and may comprise an electromagnetic sensor and/or a gyroscope. Here, the reason for detecting the direction to which the camera 130 is directed is to identify a direction of the image photographed by the camera 130. In other words, an AR display function according to an exemplary embodiment of the present invention may display the location of the other subscriber in the image photographed by the camera 130 and, to this end, a photographing direction of the camera 130 may be determined through the direction detection unit 170 and direction sensor 175.

The controller 100 may detect a distance and a direction to the other subscriber and their portable terminal according to the location (latitude and longitude) information exchanged between the portable terminal of the calling party (first portable terminal) and the portable terminal of the other subscriber (second portable terminal). In addition, the detected distance and direction may be displayed on the display unit 150. Also, the controller 100 may display the location of the other subscriber and direction information detected by the direction detection unit 170 on an image screen photographed by the camera 130 as well as distance change information according to movement of the calling party.

As discussed herein above, according to an exemplary embodiment of the present invention, a method of displaying the location information of the other subscriber may be applied to a video call. In the below description, it is assumed that the calling performs the video call with the other subscriber.

In this case of a video call with the other subscriber, the portable terminal which transmits the location information has an application that generates the location information and, to this end, the location detection unit (here, e.g., GPS receiving unit) 160 and a route that can access a 'share my location' menu need to be provided. Also, the portable terminal which receives and displays the location information includes the camera 130, the location detection unit 160, the display unit 150 which includes as shown in FIG. 2 a first area 210 (a first display area) in which an image of the other subscriber is displayed during the video call and a second area 220 (a second display area) in which an image of the calling party is displayed, and an application interprets the received location information of the other subscriber, and an AR display function displaying the location information of the other subscriber in the display area of the display unit 150.

Figure 2:
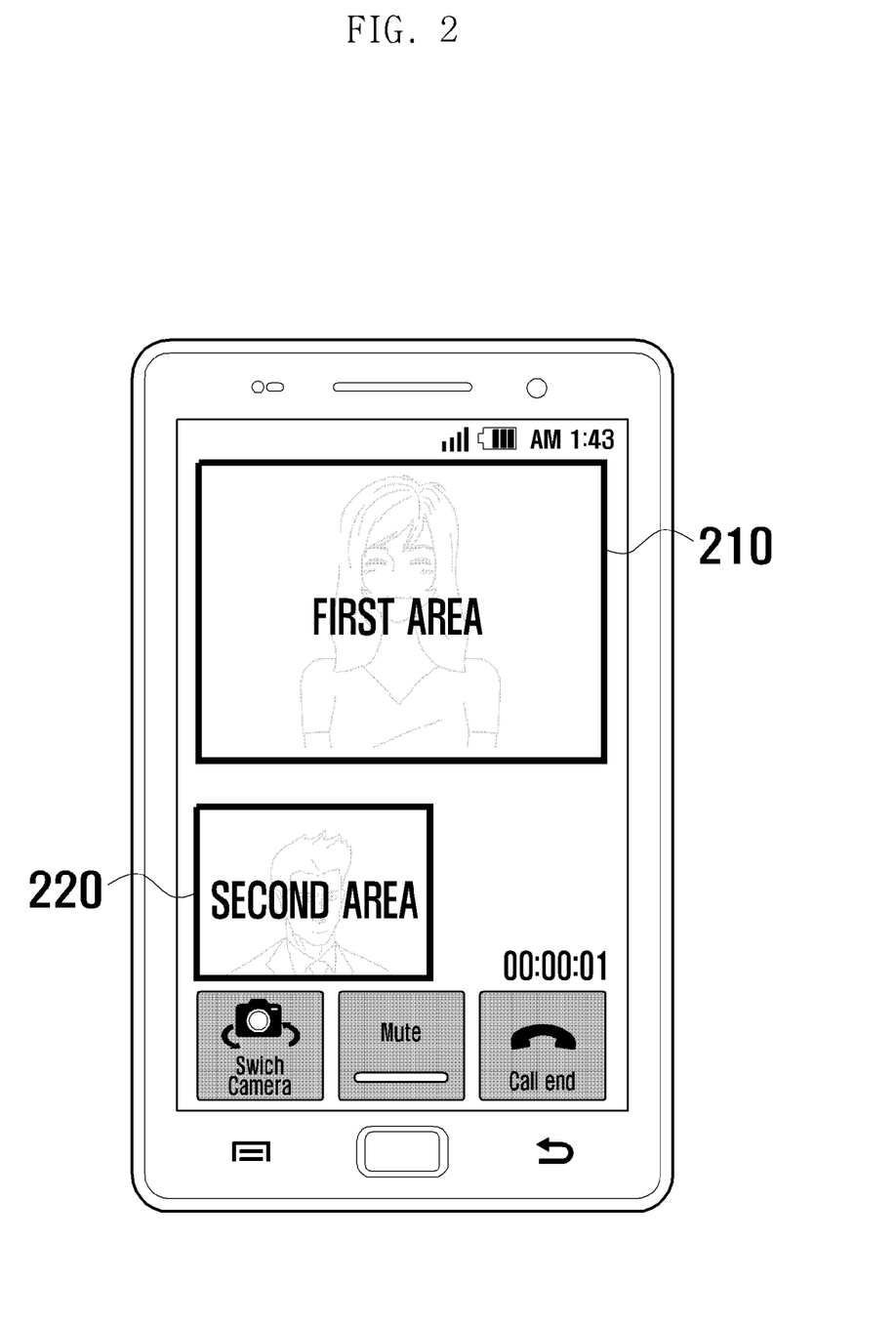
FIG. 2 is a view illustrating an example of screen display areas of a display unit displayed during a video call in a portable terminal.

FIG. 2 is a view illustrating exemplary screen display areas of the display unit 150 displayed during a video call in a portable terminal. An artisan appreciates that the appended claims are not limited to the example shown in FIG. 2.

Referring now to FIG. 2, during the video call, the image of the other subscriber (target) is displayed in the first area 210 of the display unit 150 and the image of the calling party (initiator) is displayed in the second area 220. Here, the image of the calling party displayed in the second area 220 may comprise an image photographed by the camera 130 positioned on a front side of the portable terminal.

Figure 3:
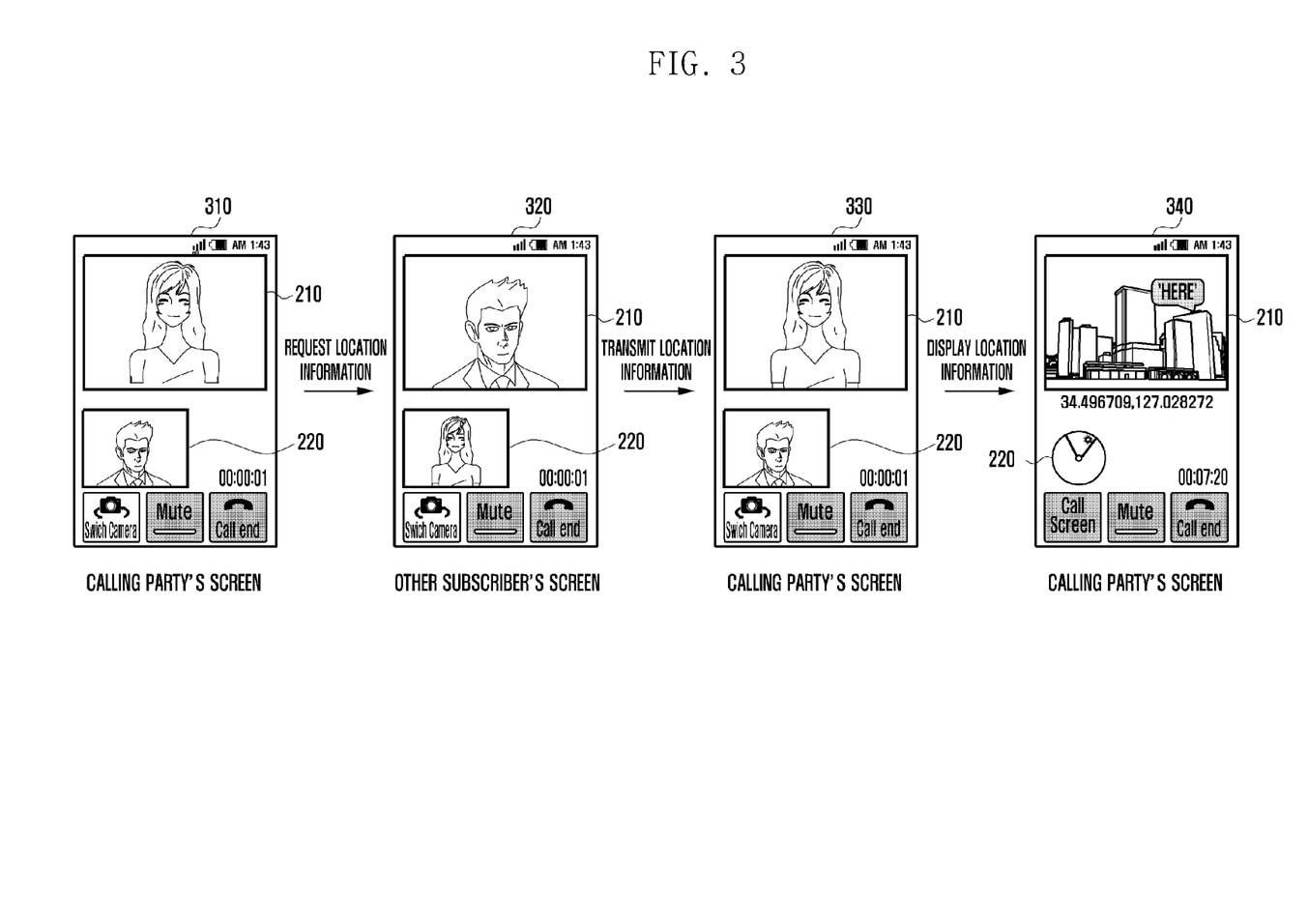
FIG. 3 is a view illustrating a process of receiving and displaying location information of other subscriber during a video call in a portable terminal according to an exemplary embodiment of the present invention.

FIG. 3 is a view illustrating an exemplary process of receiving and displaying location information of a portable terminal of another subscriber during a video call in a portable terminal according to another exemplary embodiment of the present invention.

Referring now to FIG. 3, in a state in which the video call is performed while being displayed on the display unit 150, as identified by reference number 310, when portable terminal of the calling party requests to share the location information with the portable terminal of the other subscriber who is a recipient of the calling party, the controller 100 of the calling party's portable terminal generates the location information request message to be transmitted to the other subscriber through the communication unit 120. The other subscriber's portable terminal receives the location information request as shown as identified by reference number 320. Here, when the other subscriber's portable terminal activates the 'share my location' menu, the controller 100 of the other subscriber's portable terminal detects the current location through the location detection unit 160 to generate and transmit the location information message to the calling party's portable terminal. Here, when the location detection unit 160 includes the altitude detection unit, the other subscriber's portable terminal may generate the location information comprising latitude, longitude, and altitude.

With continued reference to FIG. 3, when the calling party's portable terminal, which displays a screen identified by reference number 330, receives the location information, the controller 100 drives the rear side camera 130 to display in the first area of the display unit 150 as identified by reference number 340, detects the location thereof through the location detection unit 160, and detects the direction to which the camera 130 is directed through the direction detection unit 170. In reference number 340, a group of buildings are shown with the annotation "here". An artisan appreciates that another term or a different type of image could be shown. Next, the controller 100 analyzes the location information of the other subscriber and the location information thereof to calculate a distance between the calling party and the other subscriber and identify the direction according to the location information (latitude and longitude) of the other subscriber and itself. In this case, the calling party may identify the output of the direction detection unit 170 while rotating the direction of the camera 130 and set the direction toward the other subscriber, thereby aligning the direction of the camera 130 with the location of the other subscriber. Also, when a location of the camera 130 aligns with the location of the other subscriber, the controller 100 may display the location of the other subscriber on a screen displayed in the first area as identified by reference number 340. Here, the direction in which a user is positioned may be displayed in the second area of the display unit 150. Also, when the location information transmitted from the other subscriber includes the latitude and longitude information as well as the altitude information, the controller 100 may display the height information of the other subscriber's portable terminal on a screen photographed by the camera 130.

An artisan should understand and appreciating that a typical non-limiting range between the two devices may comprise, for example, a local area like a line of sight. For example, user of portable terminal requests a location information of the other portable terminal in a nearly appointed place.

As described above, regarding the location information of the portable terminal of the other subscriber displayed on the display unit 150, the AR technology may be additionally supported to provide increased detail of the information transmitted from the portable terminal of the other subscriber's portable terminal and improved convenience. The portable terminal according to an exemplary embodiment of the present invention may display the location of the other subscriber (and their portable terminal) in the areas 210 and 220 in which the image is shown during the video call, and when displaying the location of the other subscriber, the AR technology may be applied to increase utility of a preview area and provide convenience such that the user may easily locate a desired location.

As described above, when the portable terminal of the calling party requests the portable terminal of the other subscriber to share the location during a call (a video call or a general call), the portable terminal of the other subscriber receiving such a request transmits the current location of the other subscriber by automatic selection by the portable terminal or by the portable terminal detecting selection of the 'share my location' menu during the call. Then the calling party's portable terminal which receives the location information of the other subscriber switches the camera 130 from front to rear and previews a front view of the terminal. Here, in case of the video call, a preview image of the front view may be displayed in one area of an area in which the calling party's image is displayed and an area in which the other subscriber's image is displayed. Also, the controller 100 of the calling party's portable terminal may detect the direction to which the camera 130 is directed by using the direction detection unit 170 and the detection sensor 175, and may display a location of the other subscriber on the image previewed through the camera 130 when the location and the direction of the other subscriber that is identified in advance matches with that of the calling party while the calling party rotates 360 degrees with the terminal. Here, information displayed in AR includes not only the location of the other subscriber but also the direction of the other subscriber with respect to the calling party in a 360 degrees view.

Figure 4A:
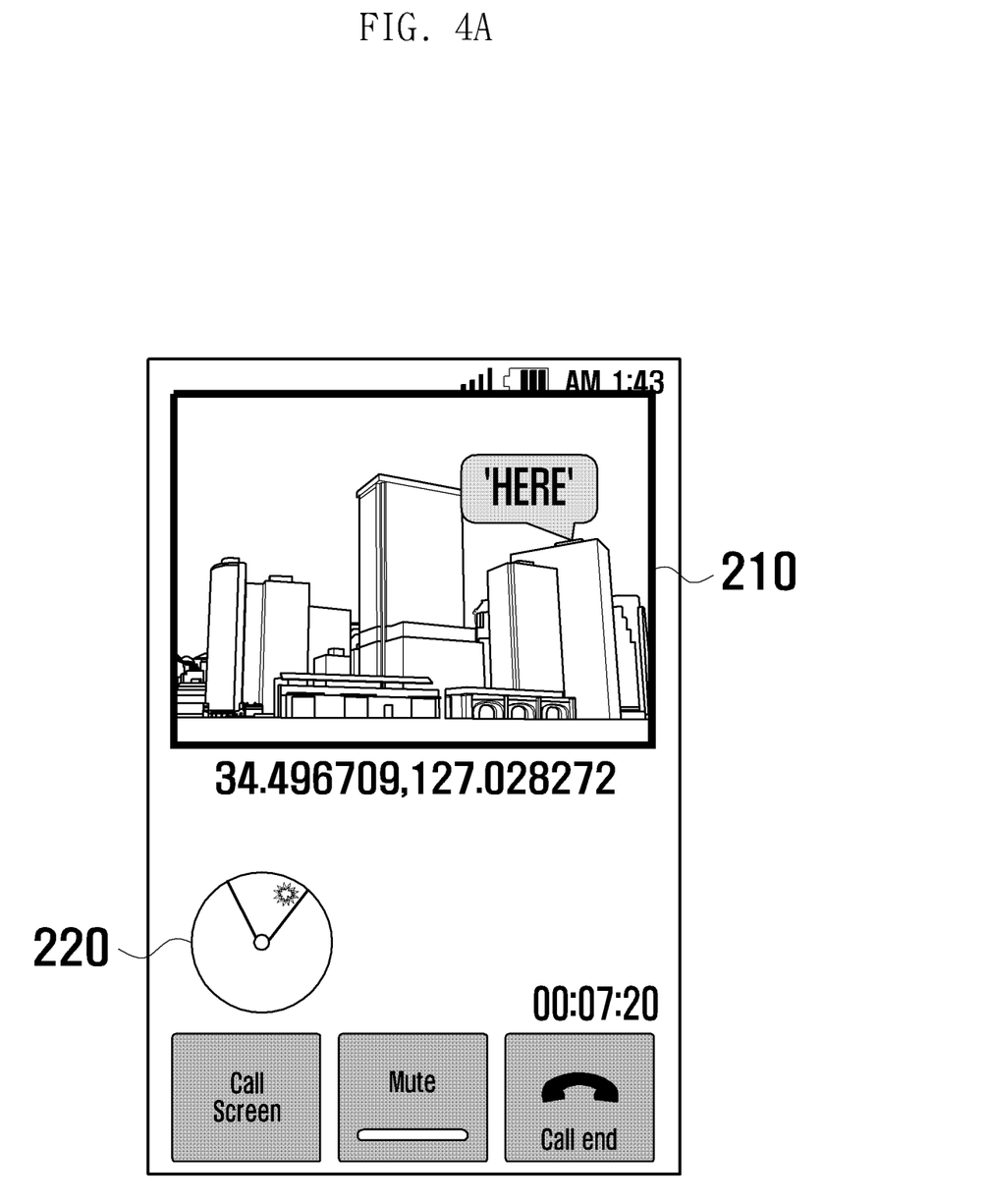
FIGS. 4A through 4E are views illustrating examples in which location information of another subscriber is displayed in a portable terminal according to an exemplary embodiment of the present invention.
Figure 4B:
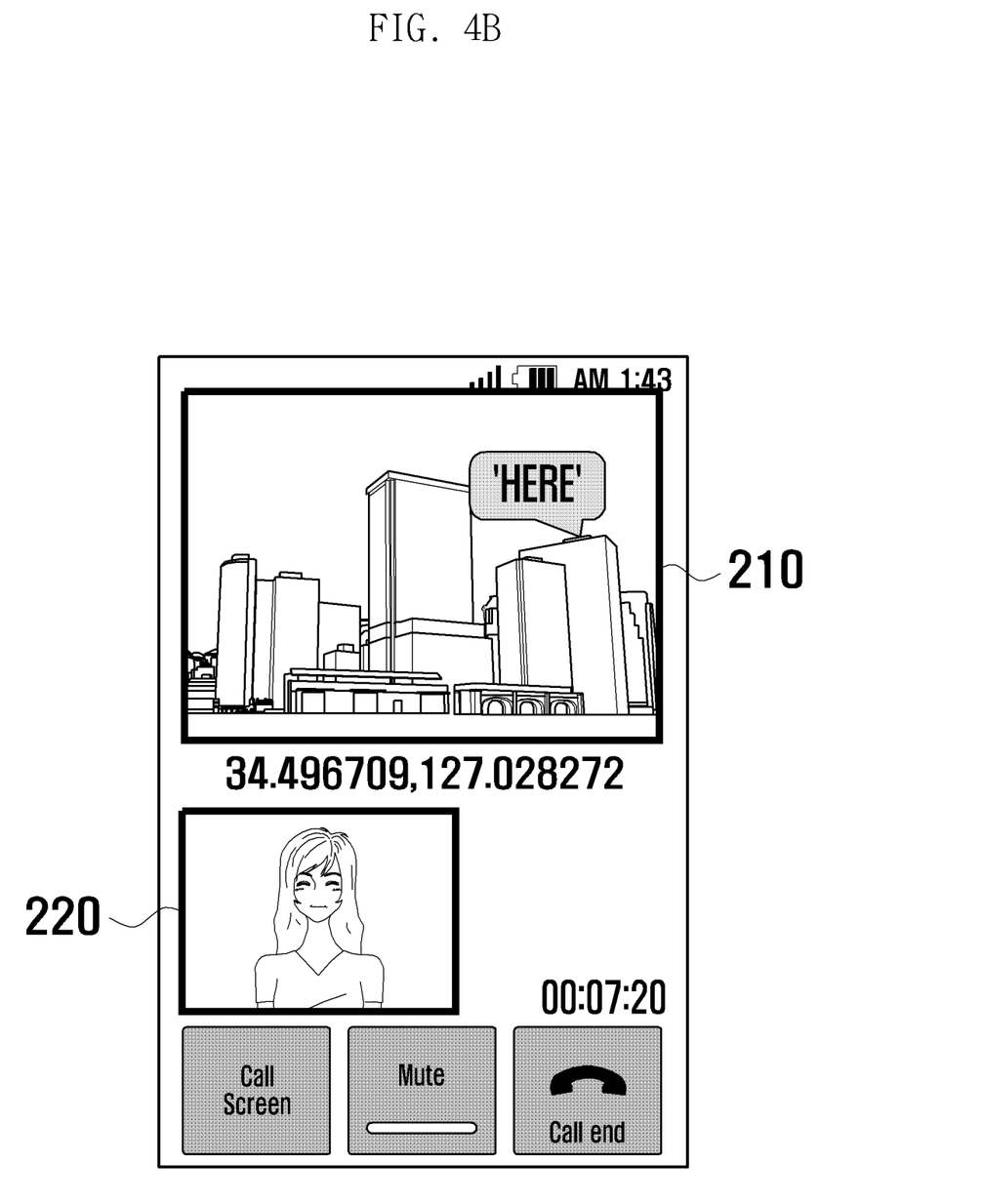
Figure 4C:
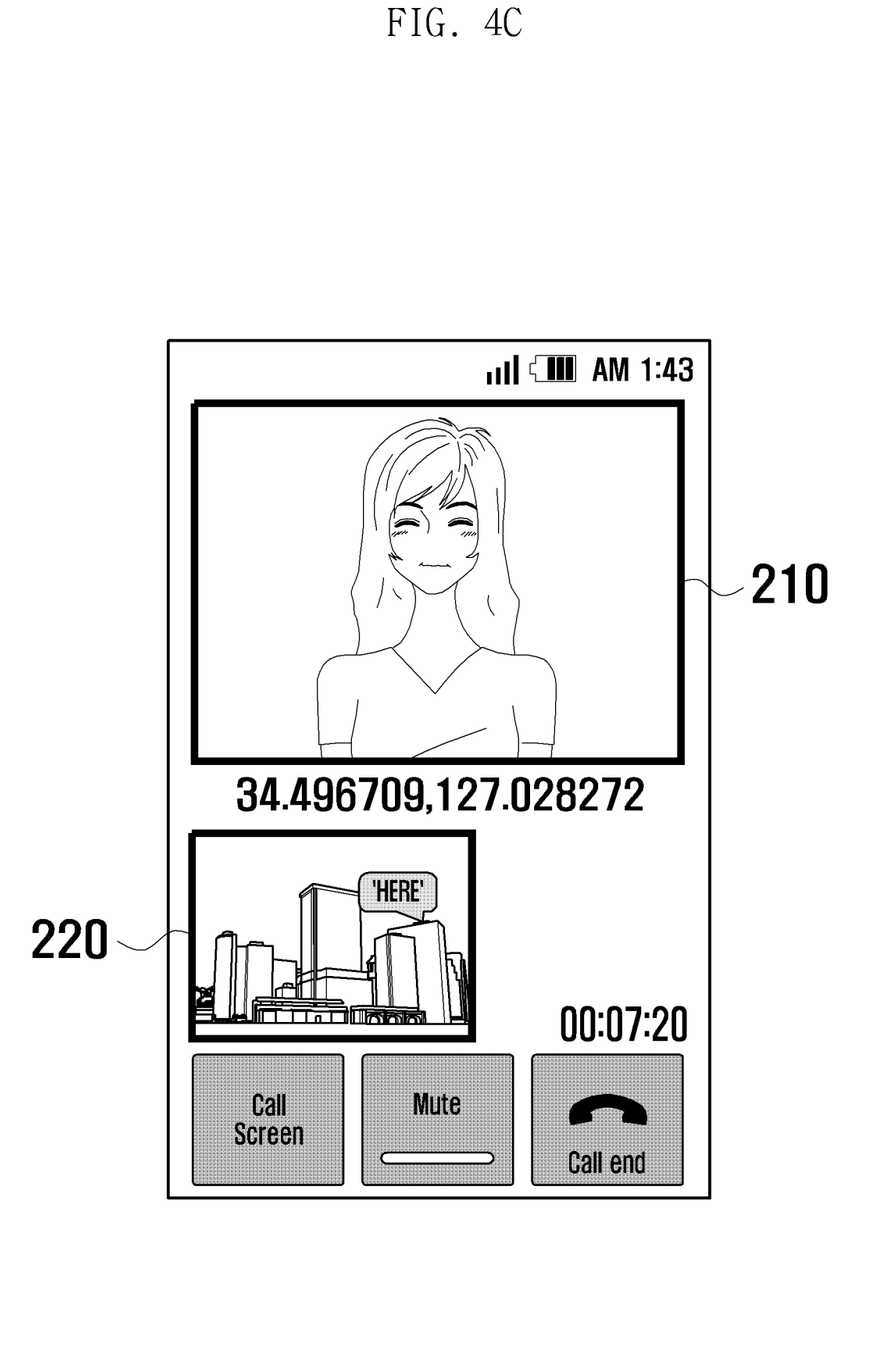
Figure 4D:
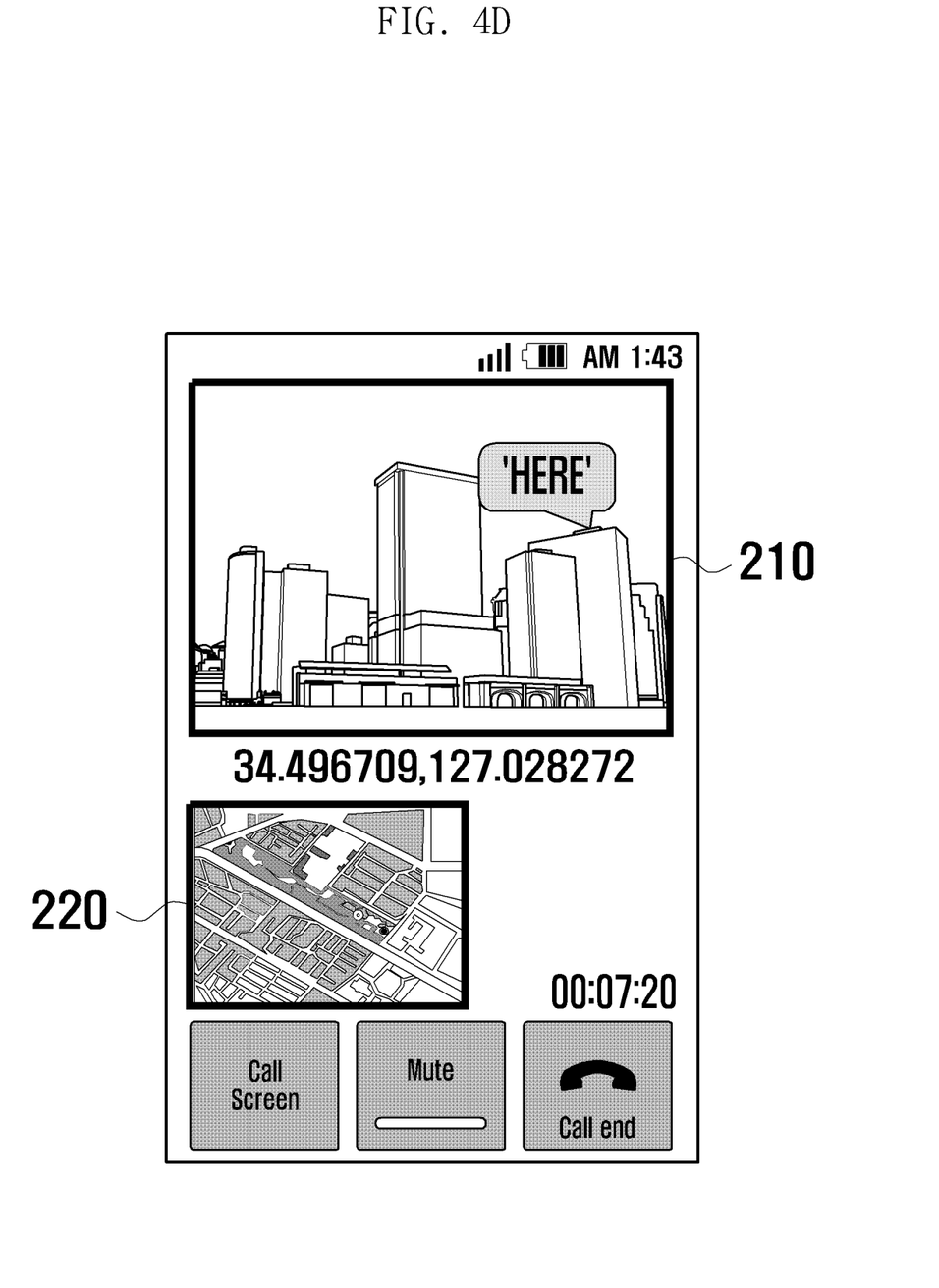

FIGS. 4A through 4E are views illustrating an example in which location information of other subscriber is displayed in a portable terminal according to an exemplary embodiment of the present invention. Here, FIG. 4A shows an example in which an image from the camera and the location information of the portable terminal, at FIG. 4B, the other subscriber is displayed in the first area 210 of the display unit 150 and the direction information is displayed in the second area 220. FIG. 4B shows an example in which the image from the camera and the location information of the other subscriber is displayed in the first area 210 of the camera 130 and the image of the other subscriber is displayed in the second area 220. FIG. 4C shows an example in which the image of the other subscriber is displayed in the first area 210 of the camera 130 and the image from the camera and the location information of the other subscriber is displayed in the second area 220. FIG. 4D shows an example in which the image from the camera and the location information of the other subscriber is displayed in the first area 210 of the camera 130 and a map is displayed in the second area 220.

Figure 4E:
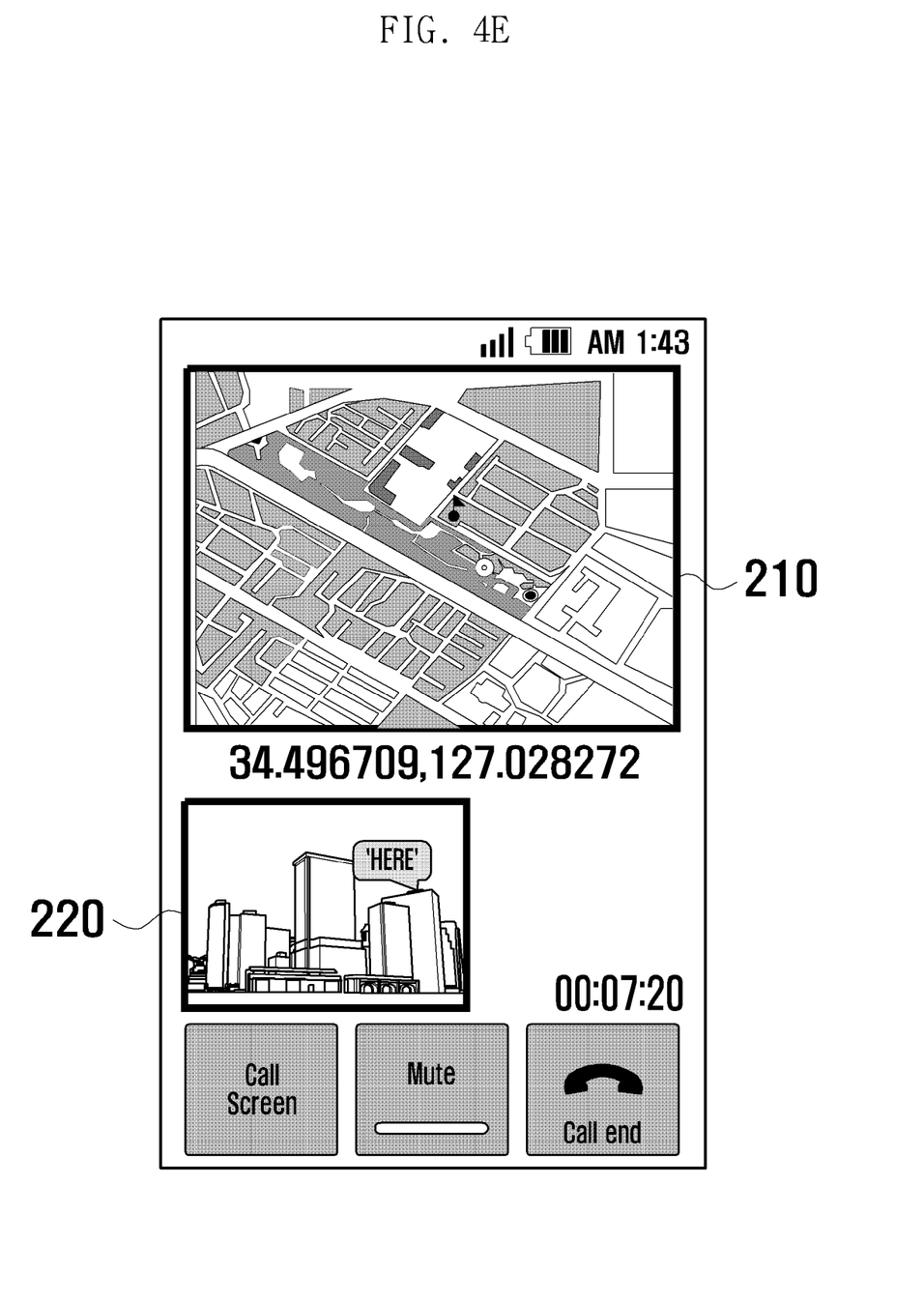

FIG. 4E shows an example in which the map is displayed in the first area 210 of the camera 130 and the image from the camera and the location information of the other subscriber is displayed in the second area 220. Namely, a method of sharing a location as shown in FIG. 4E is the same as displaying the location by using the camera 130 except that a map data instead of the image from the camera 130 is displayed in an area (here, the first area 210) in which the received location of the other subscriber is displayed. Also, the location of the other subscriber is displayed as a pin on displayed map information. In this case, in an area (for example, the first area 210) in which the other subscriber's image is displayed, other application information such as map information, which may include a memo or a note, is displayed instead of the image from the camera. Here, when the map information is a 3D map and the user location information includes the altitude information, the user's location may be displayed as three dimensional information.

Also, when displaying the other subscriber's location on the image from the camera 130 as shown in FIGS. 4A through 4D', if additional information, e.g., a note or a memo, other than the location information of the other subscriber is received, the controller 100 of the calling party's portable terminal may display the additional information on the other subscriber's location displayed on the image from the camera 130. In this case, the additional information may be a building name, a business name, a floor, or a company in a place in which the other subscriber is located.

Figure 5:
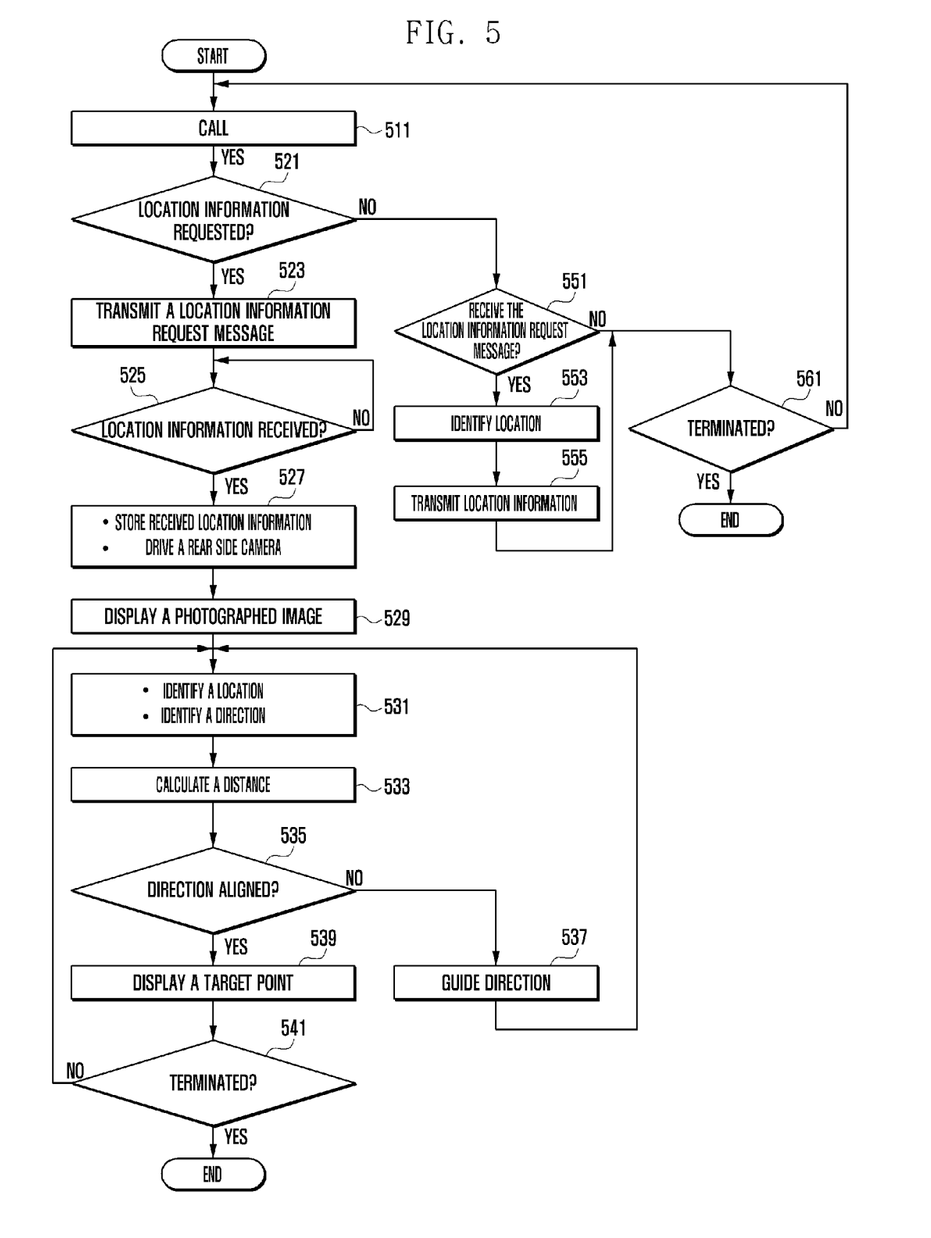
FIG. 5 is a flow chart illustrating a process of displaying a location of other subscriber during a call in a portable terminal according to an exemplary embodiment of the present invention.

FIG. 5 is a flow chart illustrating a process of displaying a location of other subscriber during a call in a portable terminal according to an exemplary embodiment of the present invention.

Referring now to FIG. 5, at (511) the controller 100 services a call from a portable terminal the other subscriber. Here, the call may be the general call (voice call) and/or the video call. In the below description, it is assumed that the call is the video call. In this case, the controller 100 services a call while displaying a screen shown in FIG. 2 on the display unit 150. In the above condition, the portable terminal of calling party may request from the portable terminal of the other subscriber for transmission of the location information. Here, the location information request may be performed by using a location information request menu or by voice during a call. Here, when the transmission of the location information of the other subscriber is requested through the menu, at (521), the controller 100 detects, generates the location information request message, and at (523) transmits the generated location information request message to the other subscriber's portable terminal through the communication unit 120.

Here, at (551) the controller 100 of the portable terminal which receives the location information request message detects the location information request message, and identifies the location information of the portable terminal through the location detection unit 160 (553). In this particular case, the location information may comprise the latitude and longitude information, and when the location detection unit 160 comprises the height (altitude) sensor, the location information may comprise latitude, longitude and height information. After the location information is identified, at (555) the controller 100 generates the location information message to be transmitted to the calling party's portable terminal (namely, the portable terminal which requests the transmission of the location information) through the communication unit 120. Also, when the location information is requested from the calling party's portable terminal through a detected voice command, the portable terminal of the other subscriber detects selection of the 'share my location' menu during the call. Then the controller 100 detects that the transmission of the location information is transmitted at step 551, obtains the location information of the portable terminal through the location detection unit 160 at step 553, and generates the obtained location information into a message to be sent from the calling party's portable terminal at step 555.

As described above, when the other subscriber's portable terminal receives the location information request message from the calling party's portable terminal, or the 'share my location' menu is selected by a subscriber or opens as a default, the controller 100 detects this information request at step 551, obtains the current location information of the terminal at step 553, and generates the location information into the message to be sent to the calling party's portable terminal at step 555. The location information may include the height (altitude) information as well as the latitude and longitude information. Also, the portable terminal of the other subscriber may transmit, as received through the input unit 140, a memo and/or a note message to be sent with the location information. Here, information of the memo and/or note may be additional information such as, for example, a building name, a business name, a street name, a floor, or surrounding information of an area in which the portable terminal of the other subscriber is located.

When the location information is received from the other subscriber's portable terminal after the transmission of the location information is requested, at (525) the controller 100 detects this receipt of requested information, stores at (527) the received location information of the other subscriber in the memory 110, and drives the rear side camera 130. Here, the reason for driving the rear side camera 130 is to display the location of the other subscriber in the AR function. Here, when the location of the other subscriber is displayed as the map information, the driving of the rear side camera 130 may be omitted. After driving the rear side camera 130, at (529) the controller 100 controls display of an image photographed by the camera 130 on the display unit 150. Here, the image photographed by the camera 130 may be displayed in the first area 210 in which the other subscriber's image is displayed. In this case, the image of the other subscriber may be displayed in the second area 220 in which the calling party's image is displayed.

Next, at (531) the controller 100 detects the location and direction of the calling party's portable terminal. In other words, the controller 100 detects the location information of the calling party's portable terminal through the location detection unit 160 and detects the direction of the image currently photographed by the camera 130 through the direction detection unit 170. Next, the controller 100 analyzes the location information of the calling party's portable terminal and the received location information of the other subscriber to calculate the distance between the two portable terminals (533). Here, the location information comprises the latitude and longitude information such that the distance between the two terminals and the direction in which the other subscriber's portable terminal is located may be known. Therefore, when the portable terminal is rotated, the controller 100 detects a moving direction of the portable terminal through the location detection unit 160, and when the portable terminal is rotated until the photographing direction of the camera 130 aligns with a direction in which the other subscriber is located, the image photographed by the camera 130 in the direction in which the other subscriber is located may be obtained.

Here, when the direction in which the camera 130 is directed is different from the direction in which the other subscriber is directed, the controller 100 may detect this through the location detection unit 160. When the photographing direction of the camera 130 is different from the direction in which the other subscriber is located, at (535) the controller 100 detects this difference in direction and at (537) may control an output of a message for directing to rotate the direction of the terminal through the display unit 150 or a speaker (not shown). When the photographing direction of the camera 130 aligns with the direction in which the other subscriber is located (namely, when the location of the other subscriber can be displayed within the image photographed by the camera 130), the controller 100 detects this at step 535 and at (539) display the location of the other subscriber (e.g. the target point). Here, when the location information transmitted from the other subscriber includes the altitude information, the controller 100 may display the other subscriber's location of the portable terminal at a corresponding altitude in the photographed image. Also, a method of displaying the location of the other subscriber may be displayed in one method among display methods as in FIGS. 4A through 4E. Also, the above method of displaying a target point may display location information and distance of the other subscriber and/or information of the memo/note transmitted by the other subscriber.

When the location of the other subscriber is displayed as in the above, the calling party may identify the location of the other subscriber that is displayed in one of forms as shown in FIGS. 4A through 4E and move to the other subscriber. Also, the display of the other subscriber's location is terminated when the calling party terminates the display of the location information or reaches a predefined destination. When terminated, at (541) the controller 100 detects this termination and ends the process of displaying the other subscriber's location.

A method of displaying the other subscriber's location performed as shown in FIG. 5 may be performed during the video call (video call mode). However, the method of displaying the other subscriber's location described above may also be performed in the same manner during a general call (voice call), and the appended claims do not require the portable terminals to be in a video call mode to practice the claimed invention. In other words, during the general (voice) call, the camera 100 does not drive the camera 130 and therefore the display 150 does not display the screen as shown in FIG. 2. In the above condition, when the calling party requests the location information of the other subscriber, the other subscriber transmits the location information to the calling party while performing steps 551 to 555 in FIG. 5. Also, the calling party's portable terminal detects receipt of the location information at step 525 and stores the received location information while driving the rear side camera 130 at the same time at step 527. The following actions may be performed the same as in the case for the video call. Here, the screen displayed on the display unit 150 may be configured differently or the same as the screen during the video call. In other words, the screen image photographed by the camera 130 may be displayed on an entire screen of the display unit 150 or may be displayed as shown in FIGS. 4A, 4D and 4E. In this case, when the image of the camera 130 is displayed on the entire screen of the display unit 150, the controller 100 may display only the image photographed by the camera 130 and also display in an overlay the direction information and/or map information.

According to the present invention, when a portable terminal of a calling party requests location information of the portable terminal of another subscriber during a call between the portable terminals, the location information is received and displayed on a communication window (a window in which an image of the calling party is displayed) such that the inconvenience of switching to other windows (or other applications) for viewing a searched result as in the conventional art is eliminated or may be avoided and utility of a window used in a video call (a two way communication) may be increased.

The above-described methods according to the present invention can be implemented in hardware, firmware or as software or computer code loaded into hardware such as a processor or microprocessor and executed, the machine executable code being stored on a recording medium such as a CD ROM, an RAM, a floppy disk, a hard disk, or a magneto-optical disk or computer code downloaded over a network originally stored on a remote recording medium or a non-transitory machine readable medium and to be stored on a local recording non-transitory medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, thumbnail, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The terms "unit" or "module" as used herein is to be understood as constituting hardware such as a processor or microprocessor configured for a certain desired functionality in accordance with statutory subject matter under 35 U.S.C. §101 and does not constitute software per se.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A portable terminal that detects and displays a location of a second portable terminal during a wireless call therebetween, the portable terminal being a first portable comprising:
  a display unit;
  a communication unit;
  a location detection unit configured to detect a first location of the first portable terminal;
  a direction detection unit configured to detect a direction of the first portable terminal relative to the second portable terminal during a call between the first portable terminal and the second portable terminal;
  a camera configured to photograph an image;
  a controller configured to receive location information of the second portable terminal while the first portable terminal is engaged in a call mode with the second portable terminal, configured to operate the camera upon receiving the location information of the second portable terminal to display an image photographed by the camera on the display, configured to analyze the first location information detected by the location detection unit of the first portable terminal and the received location information of the second portable terminal to calculate a distance between the first portable terminal and the second portable terminal, and configured to display the location of the second portable terminal on the displayed image when a direction of the first portable terminal detected by the direction detection unit aligns with the location of the second portable terminal; and wherein the display unit is configured to display a location of the second portable terminal on the image photographed by the camera, according to control of the controller.

2. The portable terminal of claim 1, wherein the controller of the first portable terminal detects latitude and longitude information of the second portable terminal in response to a location information request from the first portable terminal, which receives the location information transmitted by the second portable terminal.

3. The portable terminal of claim 2, wherein the first portable terminal upon activation of a "share my location menu", the controller controls the transmission of location information that is transmitted by the first portable terminal.

4. The portable terminal of claim 2, wherein the controller drives a rear side camera upon receiving the location information of the second portable terminal and displays an image photographed by the rear side camera on the display unit.

5. The portable terminal of claim 4, wherein the controller is configured to analyze the received location information of the second portable terminal and the detected location information of the second portable terminal to identify the distance between the first portable terminal and the second portable terminal and a direction of the second portable terminal, and when the direction detected by the direction detection unit aligns with a direction in which the first terminal is located, the controller displays the location of the second portable terminal on the image photographed by the camera.

6. The portable terminal of claim 5, wherein the location information received from the second portable terminal includes altitude information of a height of the second portable terminal and the controller displays the location of the second portable terminal on the image photographed by the camera in consideration of the altitude information.

7. The portable terminal of claim 5, wherein the location information received from the second portable terminal further comprises additional information related to a place in which the second portable terminal is located, and the controller displays the location of the second portable terminal along with the additional information on the image photographed by the camera.

8. The portable terminal of claim 5, wherein the call mode is a video call mode and the display unit displays an image of another subscriber of the second portable terminal and an image of a calling party of the first portable terminal in a first area and a second area, respectively wherein the second area is smaller than the first area.

9. The portable terminal of claim 8, wherein the controller displays an image from the camera and the location of the second portable terminal in the first area and displays direction information in the second area.

10. The portable terminal of claim 8, wherein the controller displays an image from the camera and the location of the second portable terminal in the first area and displays the image of said another subscriber in the second area.

11. The portable terminal of claim 8, further comprising:
a memory configured to store a map data, wherein the controller displays the map data and the location of the second portable terminal in the first area.

12. A method of displaying a location of a second portable terminal in a calling party's first portable terminal while the first portable terminal and the second portable terminal are engaged in a call, the method comprising:
performing by the first portable terminal a call mode;
driving by a controller a camera upon the first portable terminal receiving location information of the second portable terminal in the call mode to display an image photographed by the camera; and
analyzing by the controller location information of the first portable detected by a location detection unit and the received location information of the second portable terminal to calculate a distance between two terminals and displaying a location of the second portable terminal on the displayed image when a direction of the first portable terminal detected by a direction detection unit aligns with a direction of the second portable terminal.

13. The method of claim 12, further comprising:
detecting, by the first portable terminal, latitude and longitude information of the second portable terminal when transmission of location information is received by the first portable terminal and transmitting the location information to the second portable terminal.

14. The method of claim 12, wherein the driving the camera by the controller to display the photographed image comprises:
driving a rear side camera and controlling display of an image photographed by the rear side camera on the display unit.

15. The method of claim 14, wherein the displaying by the first portable terminal the location of the second portable terminal comprises:
analyzing by the controller the received location information of the second portable terminal and the detected location information of the second portable terminal to identify the distance between the first and second portable terminals and a direction of the second portable terminal; and
when the direction detected by the direction detection unit aligns with a direction in which the terminal is located, displaying the location of the second portable terminal on the image photographed by the camera.

16. The method of claim 15, wherein the location information received from the second portable terminal includes altitude information and the displaying the location of the second portable terminal comprises:
displaying by the display unit the location of the second portable terminal on the image photographed by the camera in consideration of the altitude information.

17. The method of claim 15, wherein the location information received from the second portable terminal further comprises additional information related to a place in which the second portable terminal is located, and wherein the displaying the location of the second terminal comprises:
displaying the location of the portable terminal along with the additional information on the image photographed by the camera.

18. The method of claim 15, wherein the call mode is a video call mode and the display unit displays an image of a second subscriber of the second portable terminal and an image of first subscriber in a first portable terminal in a first area and a second area that is relatively smaller than the first area, respectively.

19. The method of claim 15, wherein the displaying the location of the second portable terminal comprises:
displaying an image from the camera and the location of the second portable terminal in the first area and displaying direction information in the second area.

20. The method of claim 18, wherein the displaying the location of the second portable terminal comprises:
displaying an image from the camera and the location of the second portable terminal in the first area and displaying the image of the second portable terminal in the second area.

21. The method of claim 18, further comprising:
a memory configured to store a map data, wherein the displaying the location of the second portable terminal comprises:
displaying the map data and the location of the second portable terminal in the first area.

* * * * *